US010708653B1

(12) United States Patent
Stinson et al.

(10) Patent No.: US 10,708,653 B1
(45) Date of Patent: Jul. 7, 2020

(54) ENTRY PRESENCE DETECTION FOR AUDIO-VIDEO PRODUCTS AND DEVICES

(71) Applicant: BOSE CORPORATION, Framingham, MA (US)

(72) Inventors: Scott Gerald Stinson, Upton, MA (US); Bojan Rip, Lincoln, MA (US)

(73) Assignee: BOSE CORPORATION, Framingham, MA (US)

( * ) Notice: Subject to any disclaimer, the term of this patent is extended or adjusted under 35 U.S.C. 154(b) by 0 days.

(21) Appl. No.: 16/357,985

(22) Filed: Mar. 19, 2019

(51) Int. Cl.
*H04N 21/442* (2011.01)
*G06F 1/3231* (2019.01)
*G06F 3/16* (2006.01)
*H04N 21/422* (2011.01)

(52) U.S. Cl.
CPC ..... *H04N 21/44218* (2013.01); *G06F 1/3231* (2013.01); *G06F 3/167* (2013.01); *H04N 21/42201* (2013.01)

(58) Field of Classification Search
CPC ........ H04N 21/44218; H04N 21/42201; G06F 1/3231; G06F 3/167
See application file for complete search history.

(56) References Cited

U.S. PATENT DOCUMENTS

| 7,360,232 B2 * | 4/2008 | Mitchell | H04N 7/165 348/460 |
| 2011/0292299 A1 * | 12/2011 | Lau | G06F 3/0362 348/734 |
| 2013/0061258 A1 * | 3/2013 | Takaya | H04H 60/45 725/10 |
| 2016/0132290 A1 * | 5/2016 | Raux | G06F 3/167 704/275 |
| 2018/0165933 A1 * | 6/2018 | Siminoff | H04N 7/186 |
| 2019/0246172 A1 * | 8/2019 | Cheong | G06F 3/01 |

* cited by examiner

*Primary Examiner* — Sumaiya A Chowdhury
(74) *Attorney, Agent, or Firm* — Patterson + Sheridan, LLP

(57) ABSTRACT

Aspects of the present disclosure provide an entry presence detection mechanism for audio-video devices. According to aspects, devices are activated based on detecting presence of a subject in the vicinity of a device. Further, subject-specific content is output based on preconfigured preferences and/or historical usage. As described herein, the device is activated and subject-specific content or prompts are displayed without use of a remote control. This reduces the wait time to activate a device and connected devices. When a subject is determined to have left the vicinity for a configurable amount of time, the devices enter a low-power state. In aspects, the devices enter a low-power state in response to determining that no subjects remain in the vicinity of the device for a configurable amount of time.

20 Claims, 9 Drawing Sheets

ENTRY PRESENCE DETECTION FOR AUDIO-VIDEO PRODUCTS AND DEVICES

FIELD

Aspects of the present disclosure relate to methods and apparatus by which a consumer electronics product detects presence of a subject and activates functions of the product based on a location, distance, velocity, and/or a vector of motion between the subject and the product.

BACKGROUND

Certain consumer electronics products or devices support the capability to display video, images, or text content. A processor runs extensive software that generates the rich video or display content. Such devices likely take a significant amount of time to boot-up, activate, and become responsive to a subject. In an example, after activation, typically, 10 to 20 seconds are needed before the product becomes usable for interaction with a subject.

Many devices employ the use of a remote control to activate the product's functionality. In an example, a remote control is typically one method for activating a television. If a subject is not able to locate the remote control, then they may have limited means by which to activate product. In certain scenarios, locating the remote control increases an amount of time the subject waits to interact with a product.

Further, a consumer electronic product or device may be attached to other products or may need to communicate with networking data services. The attached products or connected services may also need to be activated before they can be used. In some configurations, the attached products are activated with different remote controls. In an example, a television may be attached to an Internet video streaming box and speakers. After the television is activated, an additional 10 to 20 seconds may be needed for a subject to interact with the Internet streaming box or speakers.

Methods and apparatus are needed to address, at least, these challenges and, consequently, decrease the amount of time before a subject can interact with a product.

SUMMARY

All examples and features mentioned herein can be combined in any technically possible manner.

Aspects describe an entry presence detection method for consumer electronic devices. Devices activate based on detected presence of a subject. In an aspect, one or more devices perform preset or preconfigured functions in response to the subject's presence.

Certain aspects describe a two-phased entry presence detection method for consumer electronic devices. In a first phase (Phase 1), a subject approaches the area a first device serves. In an aspect, the subject approaches the area the first device serves by entering the periphery of the scene. In an example, the scene of experience is a room that includes the first device. In response to a subject entering the scene of experience, a first set of features is activated at the first device or one or more devices in communication with the first device. The first set of features includes any features that indicate a device is activated and available for interaction. In aspects, the first device and one or more devices in communication with the first device may output a flashing light or images, text, or a menu of selection options on a visual display at the device or a remote control associated with the device, or output other non-intrusive features that indicate the device is present, and available for use.

In a second phase (Phase 2), the subject moves closer to the first device and enters the main area of the scene. In an example, the main area is a smaller area within the scene (or periphery of the scene) wherein aspects provide greater accuracy in identifying vectors of motion of a subject. In aspects, in response to the subject entering the main area, functions of the first device and connected devices are activated. Additionally, a second set of features is activated at the first device or one or more devices in communication with the first device. In aspects, the main area of the scene is configurable based on historical usage with a device. In aspects, the second set of features include personalized features determined based on physical attributes of the detected subject, historical device use, or subject-specific preferences.

In aspects, upon detecting the subject has exited the periphery area of the scene, the first device and one or more devices in communication with the first device deactivate, pause audio and visual output, or enter a low-power mode. In aspects, a subject leaves the room but at least another subject remains in the main or periphery areas of the scene. In response to determining that at least one subject is in the main or periphery areas, the first device and one or more devices in communication with the first device do not pause or enter a low-power state. Instead, the device operates without interruption.

Aspects describe methods for reducing the amount of wait time experienced by subject for a device to start-up, exit from a low-power state, and/or perform a desired function. By detecting the presence of a subject and activating a product as the subject enters the general vicinity or scene of experience, the subject experiences a lower delay in activation, start-up, and usage. Furthermore, a personalized experience is created by adjusting the output of any of the devices in the scene based on the detected subject.

Aspects describe a device comprising: one or more sensors configured to collect information relating to a location of a subject relative to the device, a memory coupled to a processor, and instructions, stored in the memory that when executed, cause the processor to: determine the location of the subject relative to the device based on the information, and trigger a set of one or more features based on the location of the subject relative to the device.

In an aspect, the instructions for causing the processor to determine the location of the subject relative to the device comprise determining, based on the information, whether the subject is within a first area of locations relative to device or a second area of locations relative the device, wherein the first area of locations is farther towards an edge of detection of the device as compared to the second area of locations. In an aspect, the instructions for causing the processor to trigger the set of one or more features comprise: triggering a first set of features when the subject is within the first area of locations, and triggering a second set of features when the subject is within the second area of locations. In an aspect, the second set of features comprises configurable subject-specific features.

In an aspect, the one or more sensors comprise at least one lower-resolution camera and at least one higher-resolution camera. Determining whether the subject is within the first area of locations or within the second area of locations comprises determining, based on information received from the at least one lower-resolution camera, that the subject is in the first area of locations, and powering on the at least one higher-resolution camera in response to determining the subject is in the first area of locations to collect the information.

In an aspect, the device further comprises a light and instructions further that cause the processor to activate the light in response to determining, based on the information received from the at least one lower-resolution camera, that the subject is in the first area of locations prior to powering on the at least one higher-resolution camera.

In an aspect, the one or more sensors are further configured to collect information associated with one or more physical characteristics of the subject, and instructions cause the processor to compare the collected information associated with the one or more physical characteristics to a set of configured physical characteristics to determine an identity of the subject, wherein the set of one or more features that are triggered are based, at least in part, on the determined identity.

In an aspect, instructions further cause the processor to: determine, based on the information, the subject is decelerating and triggering the set of one or more features is based on the determined location and subject decelerating.

In an aspect, the set of one or more features comprises: one of exiting a low-power state by the device or outputting flashing lights by the device.

In an aspect, the instructions that cause the processor to trigger the set of one or more features based on the determined location the subject relative to the device comprise triggering one or more features at another device in communication with the device.

In an aspect, the instructions that cause the processor to trigger the set of one or more features is further based on at least one of acceleration of the subject, velocity of the subject, and vector of motion of the subject.

In an aspect, the set of one or more features comprises triggering a voice recognition software in the device based on the determined location.

Aspects provide a method for triggering a set of features by a device comprising: collecting, via one or more sensors, information relating to a location of a subject relative to the device, determining the location of the subject relative to the device based on the information, and triggering the set of features based on the determined location of the subject relative to the device.

In an aspect, the method further comprises determining, based on the information, whether the subject is within a first area of locations relative to the device or a second area of locations relative to the device, wherein the first area of locations is farther towards an edge of detection of the device as compared to the second area of locations. Triggering the set of features comprises triggering a first set of features when the subject is within the first area of locations, and triggering a second set of features when the subject is within the second area of locations. In an example, the second set of features comprise configurable subject-specific features.

In an aspect, the method further comprises receiving input associated with physical characteristics for individual subjects in a set of subjects, receiving input associated with preferred features to be triggered for each of the individual subjects in the set of subjects, collecting, via the one or more sensors, information associated with one or more physical characteristics of the subject, and comparing the collected information associated with the one or more physical characteristics to the received input associated with the physical characteristics for the individual subjects to identify the subject as one of the subjects in the set of subjects. The set of features that are triggered are based, at least in part, on the identified subject and the received input associated with the preferred features to be triggered.

In an aspect, triggering the set of features comprises triggering a feature in another device external to the device.

Aspects provide a device comprising instructions stored in memory that when executed cause a processor to: collect, using at least one camera sensor, information relating to a location of a subject relative to the device and physical characteristics of the subject, receive input associated with physical characteristics for individual subjects in a set of subjects, receive input associated with subject-specific features for each of the individual subjects in the set of subjects, determine the location based on the information, identify the subject based on the collected physical characteristics and input associated with the physical characteristics, and trigger at least one of the subject-specific features associated with the identified subject based on the determined location.

In an aspect, the instructions further cause the processor to determine, based on the information, whether the subject is within a first area of locations relative to the device or a second area of locations relative to the device, wherein the first area of locations is farther towards an edge of detection of the device as compared to the second area of locations. The instructions further cause the processor to trigger a first set of features when the subject is in the first area of locations, wherein at least one of the subject-specific features is triggered when the subject is in the second area of locations.

In an aspect, the first set of features comprise one of exiting a low-power state by the device or outputting flashing lights by the device.

In an aspect, at least one of the subject-specific features comprise outputting an audio or video content by another device external to the device.

In an aspect the instructions further cause the processor to determine, based on the information, the subject is decelerating and triggering at least one of the subject-specific features is based on the determined location and subject decelerating.

Advantages of the entry presence detection methods will be apparent from the description and the claims.

DETAILED DESCRIPTION

Consumer electronic devices used, for example, in a living space, typically run extensive software that generates rich video, audio, or display content. A device must boot-up and exit a low-power state before a subject is able to interact with the device. Some devices are commonly activated using a remote control that is external to the electronic device. In such circumstances, a subject may need to find the remote control and then use the remote control to activate the electronic device. In certain scenarios, a first device is in communication with attached products or network communication services. These attached products may be activated after activation of the first device. At times, the attached products are activated using a different remote control than the first device.

In one example, a subject wanting to stream a television show may enter a living room, find the remote control to activate a television in the living room, wait for the television to boot-up, navigate through menus to select to select the option to receive an input from a streaming box, find the remote control to activate the streaming box, wait for the streaming box to boot-up, and navigate through selection screens to select a specific movie to watch on the television. The time between when the subject enters the living room and begins to watch the television may take up to several minutes.

As described herein, a set of features are activated when a subject enters the periphery of the room. In aspects, devices remain in a low-power state or may operate in a reduced power state that provides more functionality than a low-power state despite activating features when the subject enters the room. The set of features lets the subject know the devices are present and available for use.

When the subject moves closer to a device into the main area of the scene, devices in the room are activated. As described herein, a device is activated by exiting a low-power state or by exiting a reduced power state into a mode of operation which allows all functions of the device to operate. Accordingly, devices are activated without using a remote control or manually pressing a power button. Additionally, as second set of features are activated when the subject moves close to a device. In aspects, this set of features displays content-appropriate material for the detected subject or content based on the detected subject's presence. In aspects, after device is activated, the device outputs audio, images, menu selection options, or textual prompts to the subject, requesting what product functionality the subject wishes to use.

Figure 1:
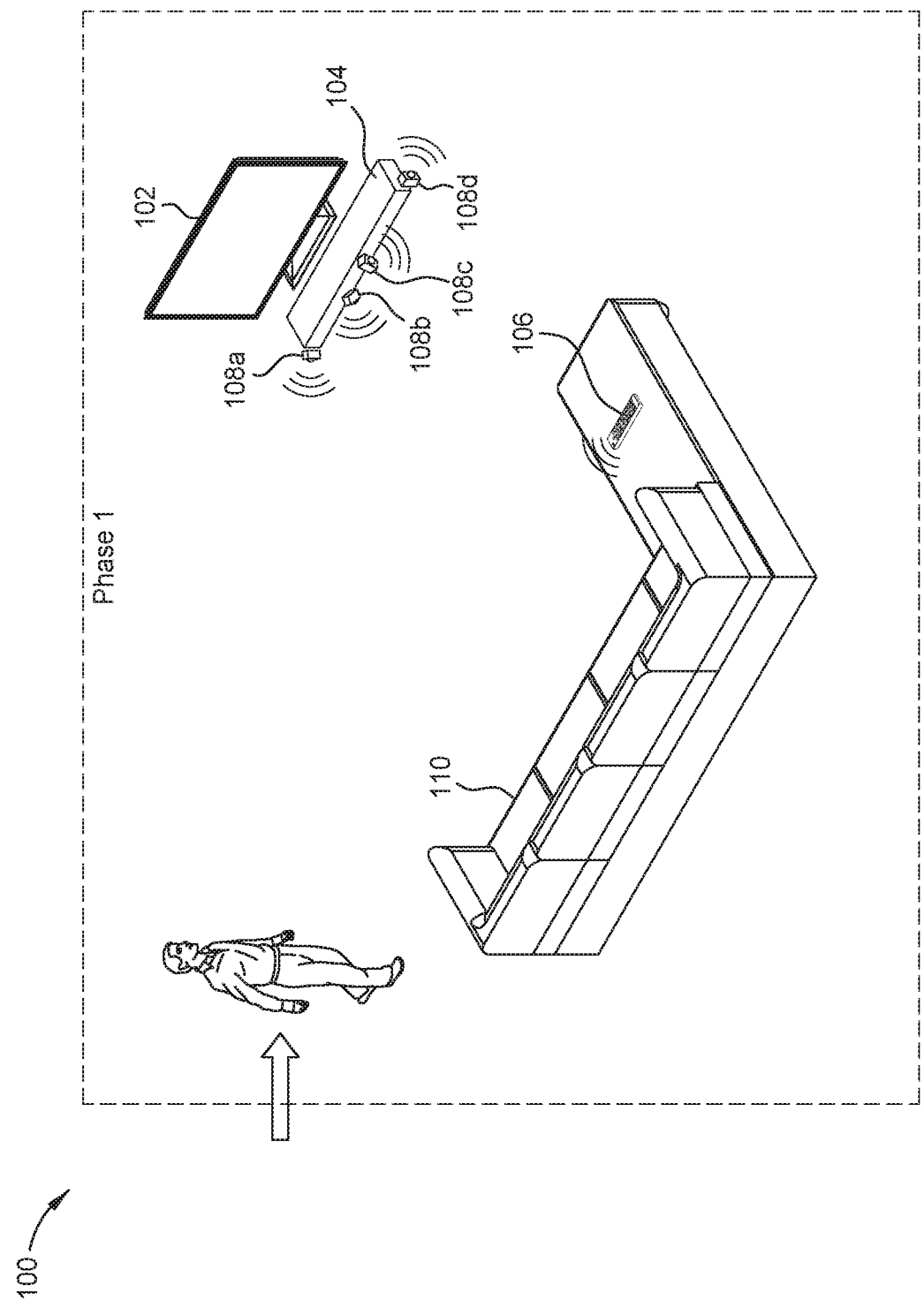
FIG. 1 illustrates an example environment that includes multiple devices and a periphery area of the scene.

FIG. 1 illustrates an example environment 100. The environment 100 may be any room in a living space, office environment, school, or building. In an example, the environment 100 is a living room in a house, a classroom in a school, or an office space in a building. The environment 100 includes a television 102, soundbar 104, and remote control 106. In examples, other devices are present in the environment, such as speakers, a voice personal assistant (VPA), a projector, and high-definition multimedia interface (HDMI) sources. These devices are in communication (wirelessly or wired) with any of the devices illustrated in FIG. 1.

One or more of the devices in the environment 100 include sensors configured to determine a distance between the device and a subject. In one example, sensors 108a, 108b, 108c, and 108d on the soundbar 104 are configured to detect the presence of a subject. Based on the signals collected using the sensors, the light bar 104 determines a generalized location between the subject and the soundbar. In aspects, the sensors are configured to collect information associated with physical characteristics of detected subjects.

As shown in FIG. 1, a subject enters the periphery of the scene in the environment 100. The periphery of the scene refers to the Phase I boundary or the scene of experience. In response to sensors detecting the presence of a subject, a first set of features are triggered at the device. In aspects, the triggered features indicate product readiness and availability. Product readiness and availability may be indicated by an audio, visual, or haptic output. The output is non-intrusive and provides an indication that the specific product is present in the environment and available if the subject wishes to interact with it. In an example, a light on the light bar 104 moves, or one or more of a light emitting diode (LED) flashes on the remote control 106, a motor on the remote control 106 vibrates, or a speaker on the remote control outputs a sound.

Figure 2:
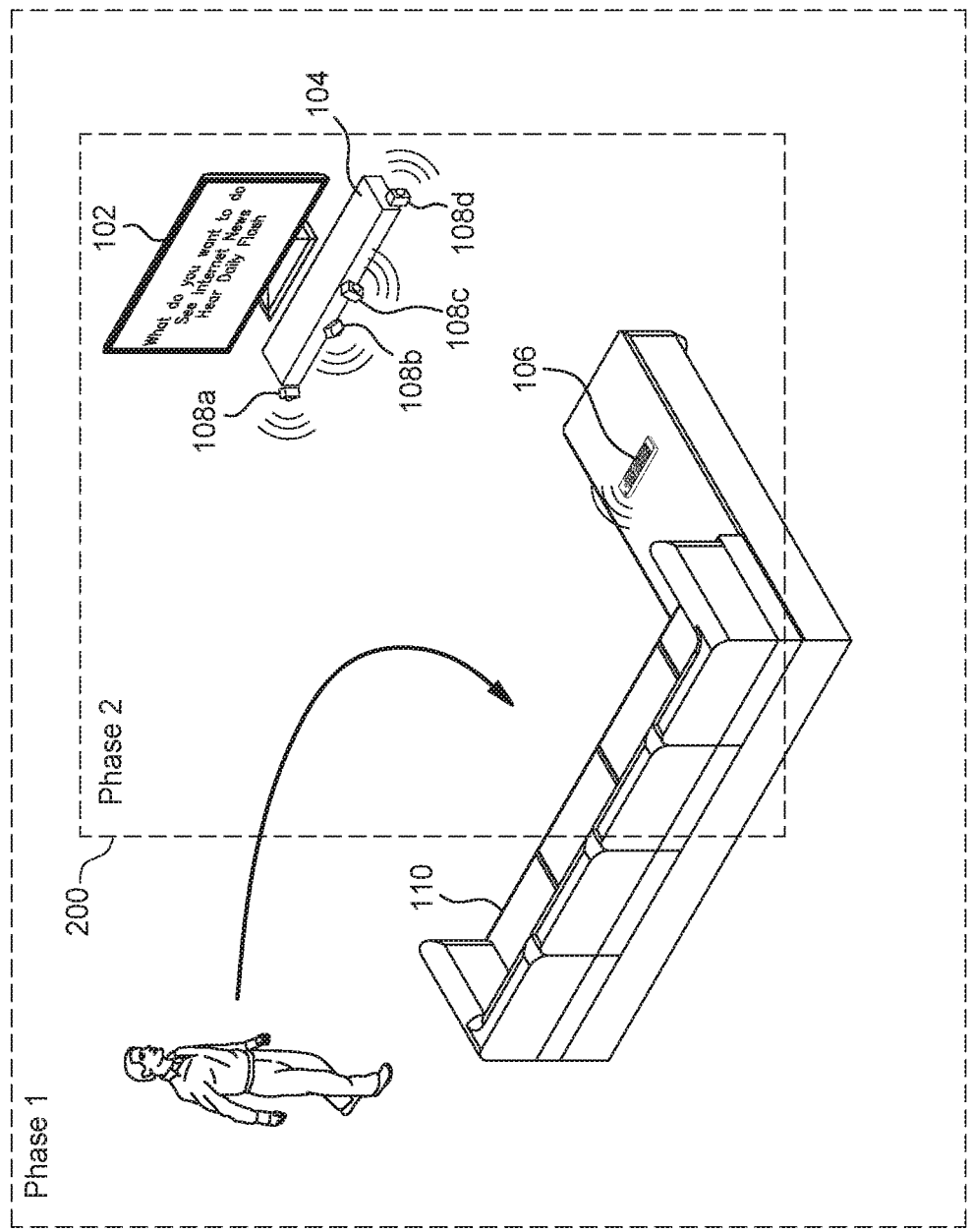
FIG. 2 illustrates an example of the subject entering a main area of the scene in the example environment.

FIG. 2 illustrates a subject who has moved from the periphery of the scene illustrated in FIG. 1 to the main area of the scene 200. The main area of the scene may be referred to as a zone of experience, or the Phase 2 boundary. The sofa 110 is closer to the soundbar 104. Sensors 108a, 108b, 108c, and 108d detect the subject's proximity to the soundbar 104 increasing as the subject approaches and sits on the sofa 110. As a result of entering the main area of the scene 200, devices and network communication services are activated.

In an example, entering the main area of the scene triggers activation of the devices. Activating features at the devices decrease the amount of time between when a subject enters a room and can interact with devices in the room because the subject does not have to physically touch a device, manually press a button, or make a gesture. Instead, the presence of the subject in an area activates devices.

The television 102 may display an introduction screen prompting the subject with a customized list of commonly accessed features by the subject. The soundbar 104 and the remote control 106 may output flashing lights, with greater intensity or a higher rate of blinks per second when the subject enters the main area. In aspects, subject-specific functions are activated at one or more devices. The functions may be specific to the detected subject based on any combination of preferences input by a subject or historical usage by the detected subject. In aspects, the preferences and historical usage information may include a type of function preferred based on a person, time of day, position in a room (e.g., sitting or standing), height of the person, or proximity to a specific device in the environment.

In aspects, the main area 200 is continuously redefined based on initial device usage and ongoing interactions. A device tracks historical preferences including, for example, the following: when a subject uses a remote associated with a device and where the subject is located; when the subject uses a voice-activated command to activate a VPA and where is the subject located; when and where the subject becomes stationary; where the subject watches video; where the subject plays music; where the subject's body profile changes from standing to sitting or from sitting to standing; in what area the subject walks by the device after which the subject does not interact with the device versus in what area the subject walks towards and the uses the device; what time of day and how a device is used; sizes of subjects that enter an environment; time, frequency and location for seeing a face; when a subject looks towards the device; maximum width of the subject; maximum height of the subject; and a height of a face. Based on any combination of this information, the zone of experience is defined and redefined.

In one example with reference to FIG. 2, the soundbar 104 tracks that subjects are frequently located on the sofa 110 while interacting with the television 102 and that a subject rarely has watched the television from the bottom right portion of the room. Accordingly, the zone of experience, over time, may be defined to include the entire sofa 110 and less area in the region to the bottom right of the television 102.

Figure 3:
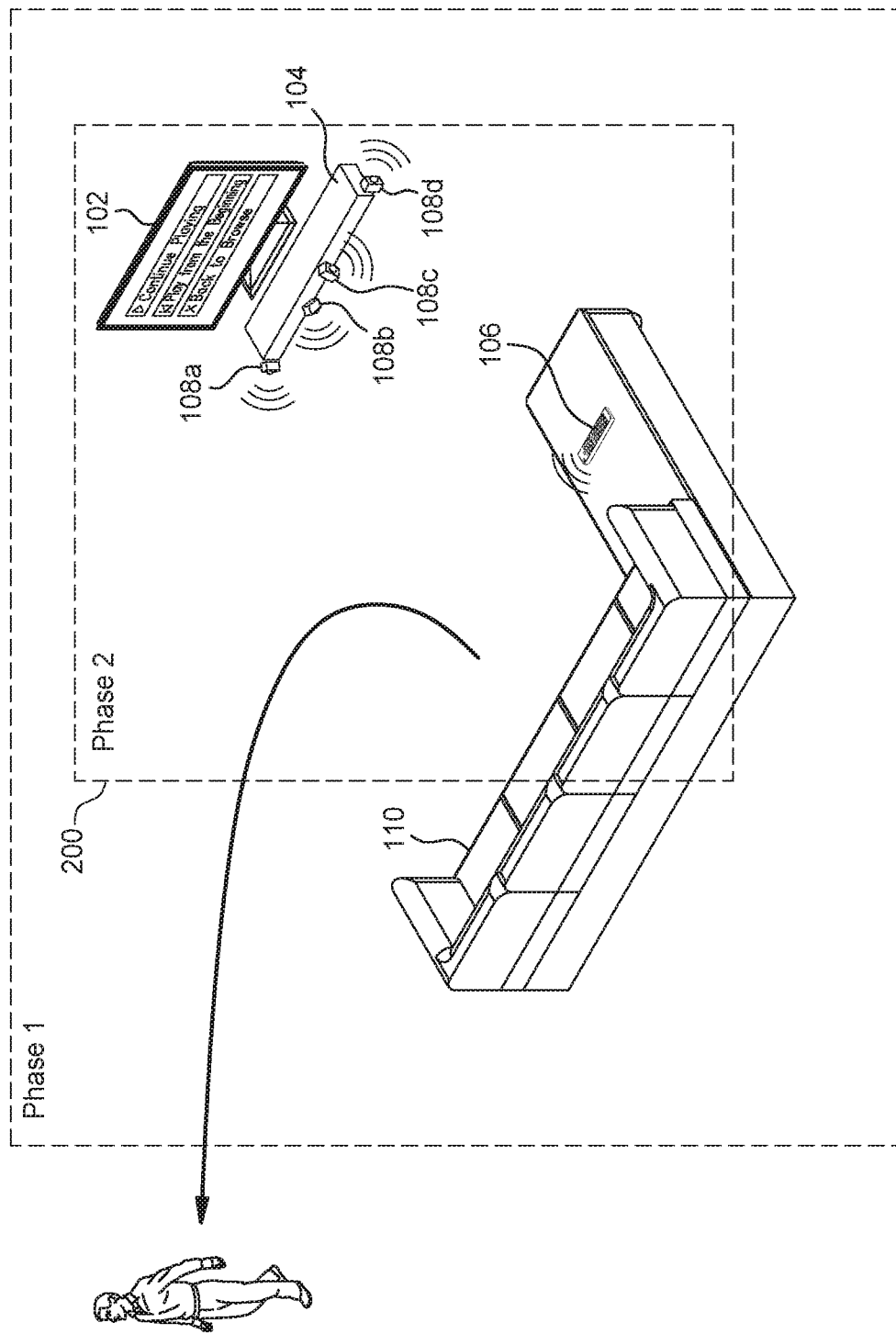
FIG. 3 illustrates an example of the subject leaving the periphery area in the example environment.

FIG. 3 illustrates the subject exiting the scene of experience. In an example, based on information collected from one or more of the sensors 108*a*, 108*b*, 108*c*, and 108*d*, the soundbar 104 determines the subject has left the scene of experience 100. In response, the soundbar 104 or a device in communication with the soundbar 104 pauses, begins a sleep-count down prior to entering a low-power state, or enters a low-power state.

Proximity, physical characteristics, vector of motion, distance, and location information associated with a subject is collected using sensors integrated into any of the devices in the environment. Based on the subject's proximity, devices may capture the subject's attention during Phase 1, at a first point of interaction when the subject enters the scene of experience. In Phase 2, the devices build upon the subject's attention by demonstrating functionality in response to determining the subject has moved closer to the device, and is in the zone of experience.

The phased aspect of entry detection is simultaneously power efficient and captures the subject's attention. During Phase 1, a first set of features are activated; however, a device itself is not fully activated. Any of the devices in the environment may output an audio, visual, or haptic output in Phase 1 while the device itself remains in a power-saving mode. Entry into the main area or zone of experience activates devices and product functions. Waiting to activate devices until a subject is determined to be in the main area avoids having to turn off a product every time a subject enters the periphery or main areas of the scene.

In an example, a subject crosses through part of the environment 100 on his way to another room in the house. The subject may enter the periphery area but may not enter the main area. While devices in the environment output indications of product readiness, they do not activate. Therefore, these products will not be unnecessarily turned on and consume power. Additionally, these products will not remain on until a period of inactivity is determined or will not need to be manually turned off.

In aspects, more than one subject is in the main area of the scene. Multiple people may be, for example, watching a television program. Information collected using the sensors may indicate that at least one subject has left the room entirely or simply exited the periphery area. Because the sensors also determine that other people remain the zone, the television continues without disruption. Accordingly, the television does not pause or enter a low-power state because subjects remain in the room.

The devices illustrated in FIGS. 1-3 have one or more of a memory and processor, communication unit, a transceiver, an audio output transducer, and at least one sensor. The following paragraphs describe example components with reference to the soundbar 104; however, any of the devices in an environment may include one or more of the described components. Furthermore, every device does not need to include each of the described components.

Figure 4:
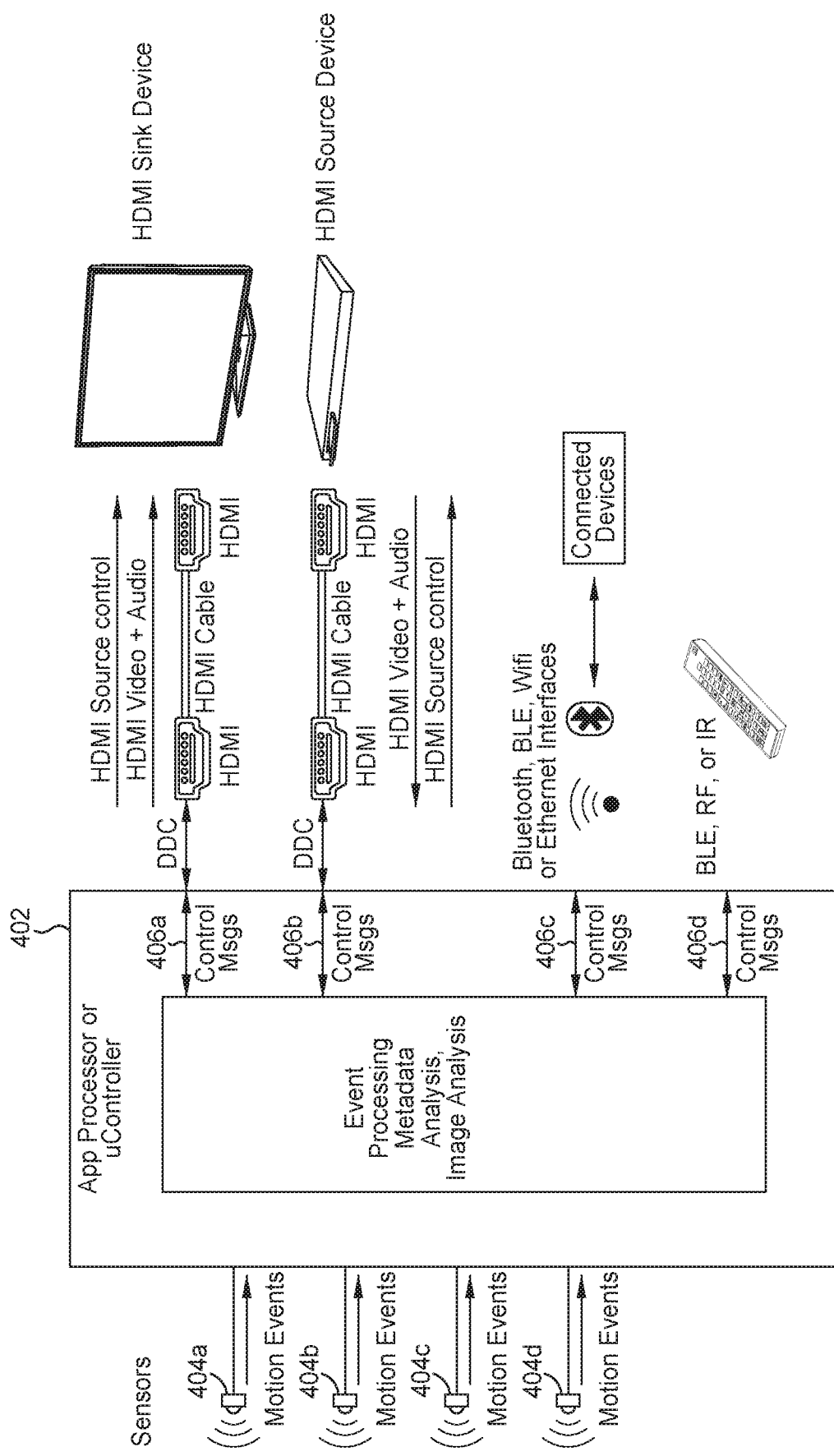
FIG. 4 illustrates an example processor.

FIG. 4 illustrates an example processor of a device. The processor 402 may be referred to as an application processor, microcontroller processor, or digital processor. The processor 402 controls the general operation of the soundbar 104. For example, the processor 402 performs process and control for audio and/or data communication. The processor 402 is configured to receive motion and image information from at least one sensor 404*a*, 404*b*, 404*c*, and 404*d*. With reference to the soundbar 104, the sensors 404*a*, 404*b*, 404*c*, and 404*d* may refer to sensors 108*a*, 108*b*, 108*c*, and 108*d*, respectively. While four sensors are illustrated in FIGS. 1-4, any number of sensors may be used. The processor 402 may calculate a distance between a subject and the device. In an example, the sensors 404*a*-404*d* may also transmit information regarding the characteristics of the detected subject to the processor 402. The information transmitted may include physical characteristics of the subject, direction of the subject's travel, speed of the subject, acceleration of a subject location of the subject in the environment, height, width, or a number of subjects in the environment.

The processor determines, based on information received from at least one sensor, if a subject is within a first range of distances or locations from the device 104 or within a second range of distance or locations from the device 104. As used herein, range refers to distance or an area in the room including the periphery and main areas. As shown in FIGS. 1 and 2, the first range of distances may be farther from the device 104 than the second range of distances. The first and second range of distances may correspond to the periphery scene area and main scene area, respectively. The range of locations generally refers to an edge of the area where the sensors are not able to achieve coverage. The range of locations can be defined by the detection areas of the sensors. The first area of locations is defined by the detection area in the periphery and the second area of locations is defined by the detection area in the main area. In aspects, the distance between the subject and the device is related to the area of locations. The processor triggers a set of features based on the distance, location, velocity, and vector of motion between the subject and the device. Features are triggered by transmitting control messages 406*a*, 406*b*, 406*c*, and 406*d* to connected devices in the environment.

Depending on the location of subject relative the device, the control messages transmit instructions to indicate product readiness, activate a device, or output subject-specific prompts. The control messages are transmitted using a direct digital control to an HDMI interface, via Bluetooth, Bluetooth Low Energy (BLE), Wi-Fi, Ethernet interfaces, radio frequency signaling, or infrared signaling to control connected devices.

In aspects, via a user interface and/or an application executed on an external device in communication with the soundbar 104, the soundbar 104 receives input regarding physical characteristics of subjects likely to interact with the device 104 and other devices in the environment 100. In an example, a person inputs height, age, weight, hair color, eye color, gender or any other information associated with a particular subject that may be used to differentiate between several subjects who interact with devices in the environment. In an aspect, based on information collected using the sensors, the processor associates a detected subject with a specific person based on input.

In aspects, via a user interface and/or an application executed on an external device in communication with the soundbar 104, the soundbar 104 receives input regarding specific preferences for the subjects who are likely to interact with the device 104 and other devices in the environment 100. Furthermore, in aspects, the processor tracks the devices used, the specific features used, the time of day, and day of the week for each detected subject. Based on detected physical characteristics and any combination of configured subject-specific preferences, and historical usage, the soundbar 104 takes action to trigger features at the soundbar and/or on other devices in communication with the soundbar.

One or more sensors on any of the devices illustrated in FIGS. 1-4 are configured to collect information to discern between a child and an adult. In aspects, without facial recognition techniques, the sensors may not be able to determine an identity of a detected subject; however, the sensors may collect enough information to customize a subject's experience. In an example, the sensors correlate a certain range of height to width ratios with an adult and another range of height and width ratios to a child. Different features are activated in main area and presented to a subject determined to be an adult as compared to a subject determined to be a child. In an example, after several activations from subjects entering the main area of the scene, and using machine learning algorithms, the device correlates certain height to width ratios with use of certain devices and features. Using historical information, devices activate certain devices or present specific features based on the detected subject's height to width ratio. In other aspects, based on height to width ratios, the device and connected devices are configured to output content-appropriate material for a detected subject. In aspects, certain features or options are blocked or made inaccessible for subjects determined to be a child, based on a detected height to width ratio.

The communication unit facilitates a wireless connection with one or more other wireless devices, such as with other devices in the subject's vicinity including for example, the television 102, remote control 106, and non-illustrated streaming box, speakers, cell phone, etc. For example, the communication unit may include one or more wireless protocol engines such as a Bluetooth engine. While Bluetooth is used as an example protocol, other communication protocols may also be used. Some examples include Bluetooth Low Energy (BLE), NFC, IEEE 802.11, WiFi, or other local area network (LAN) or personal area network (PAN) protocols. In an aspect, the soundbar 104 may wirelessly transmit information collected via one or more sensors to an external device or a network. The external device or network may process the information and transmit an indication of the distance between a detected subject and the device 104. Additionally or alternatively, the communication unit may receive information associated with a subject's physical characteristics and preferred features to use for specific devices in the environment 100.

Figure 5:
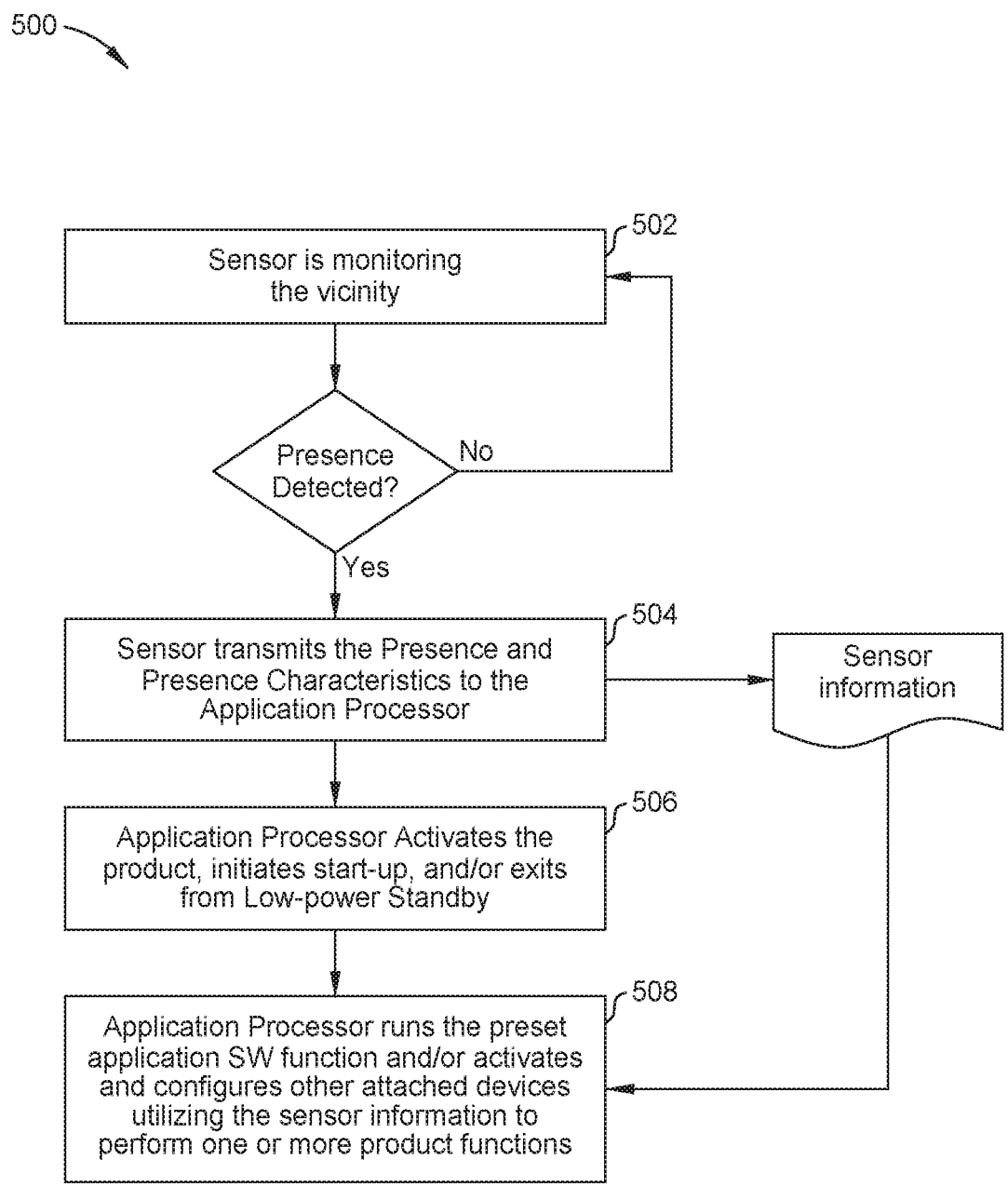
FIG. 5 illustrates example operations for entry presence detection.

FIG. 5 illustrates example operations 500 performed in accordance with aspects described herein. In an example, the soundbar 104 performs the operations 500. In another example, the soundbar 104 in communication with other devices in the environment 100 performs the operations 500.

At 502, sensors monitor the scene for presence of a subject. If presence of a subject is detected, at 504, the sensors transmit an indication of detected presence and characteristics of the detected subject to a processor. The sensors may be on any device in the environment 100.

At 506, the application processor activates the device and connected devices. The application processor initiates start-up and/or exits from a low-power state. In aspects, a set of features are activated based on the distance between the subject and the device. In aspects, a device is activated when human presence is detected. At 508, the application processor runs application software to perform one or more device functions at the device and by connected devices. At 508, the processor executes software function and/or activates and configures attached devices based on the detected subject to perform one or more product functions.

The following is an example of the operations illustrated in FIG. 5. In an aspect, a soundbar has an integrated camera sensor which detects the presence, location, and height of a subject as well as a number of subjects in a room. A processor on the soundbar receives sensor information when human presence is detected. Upon detection of human presence, the device is activated. Further, the processor activates connected devices, such as a television and an attached Internet video streaming device. The processor configures the Internet streaming device to select a specific streaming video application, for example, based on historical usage of the detected subject, historical usage information based on the time of day, or previously-configured information associated with the subject. Thereafter, output from the streaming video application is displayed on the television screen.

The operations 500 are based on entry detection, which reduces the wait time to activate a device and allows devices to perform preset or reconfigured functions in response to the detected presence of a subject. The operations 600 describe a two-phase entry activation, which further saves power by activating devices when subjects are determined to be in the zone of experience.

Figure 6:
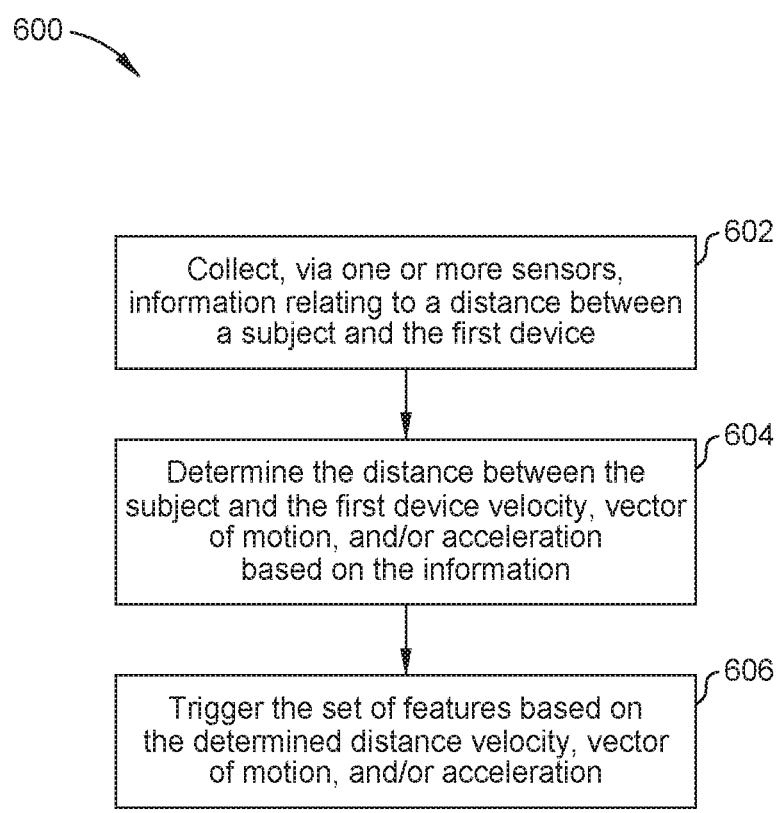
FIG. 6 illustrates example operations for a two-phased entry-based detection.

FIG. 6 illustrates example operations 600 performed in accordance with aspects described herein. The operations 600 are performed in accordance with a two-phase entry activation. In an example, the soundbar 104 performs the operations 600. In another example, the soundbar 104 in communication with other devices in the environment 100 perform the operations 600.

At 602, a device determines information relating to distance between a subject and the device. The information is determined using sensors disposed on the device itself. In aspects, the sensors include any combination of a passive infrared (PIR) sensor, infrared (IR) sensor, motion sensor, camera, proximity sensor, ultrasonic sensor or other type of sensor configured to detect presence of movement of a subject. In an aspect, the device determines information relating to distance, velocity, vector of motion, and/or acceleration using a combination of sensors disposed on the device and sensors on other devices in the environment.

At 604, the device determines the distance between the subject and the device, velocity, vector of motion, and/or acceleration based on the information collected at 602. At 606, the devices trigger features based on the determined distance between the subject and the first device. Specifically, a first set of features are triggered when the subject is in the periphery area and a second set of features are triggered when the subject is in the main area. As described above, the main area generally includes distances closer or more directly in front of to the device than the periphery.

In aspects, features indicating device availability are triggered when the subject is in the periphery area. Examples include outputting a flashing light, increasing the brightness of a light, showing a light pattern, or an audible tone. Additionally or alternatively, a device may exit a low-power state.

In aspects, the device and attached devices are activated when the subject is determined to be in the main area of the scene. Further, in aspects, subject-specific features are triggered when the subject is determined to be in the main area of the scene. In aspects, an on-device display, on-screen display, light bar, or other visual indicator or audio speaker are used to prompt the user to perform a device function. Examples of device functions include selecting an output from a connected device. In aspects, audio or video is output based on prior inputs associated with the subject or historical usage.

In an example, based on historical information, the device determines that a first subject who enters the environment 100 in the morning typically accesses the television to watch an Internet-based news feed. Further, based on historical information, the device determines that a child subject who enters the scene in the morning typically accesses a specific television show using an Internet streaming box. Based on the time of day and the identified subject, the television prompts the first subject if they would like to watch the news feed and prompts the child subject if they would like to watch the specific television show using the streaming box.

In an example, the devices receive input associated with physical characteristics of multiple subjects who may frequently interact with devices in an environment. In an example, a subject inputs physical characteristics using an application in communication with the device. Examples of physical characteristics include physical body profile from a captured image. In aspects, the devices also receive input associated with age, gender, hair color, or eye color. The sensors collect information associated with distance as well as other observable characteristics of the subject. The device compares the collected information to the input received via the application in an effort to identify a specific subject of the multiple subjects who access devices in the environment. A set of subject-specific features are triggered based on the identified subject. The subject-specific triggers include outputting age-appropriate content based on an identified subject or using historical information to present recently-used features as options for an identified subject.

Different combination of sensors and algorithms may be used to determine a subject's presence. In an aspect, a lower-resolution camera determines a subject may be present. Upon determining that a human body is present, the lower-resolution camera may activate a higher-resolution camera sensor and facial recognition software. Therefore, a high-resolution, power hungry, camera sensor and facial recognition software is only activated when a human body is detected and its relative location has been established in the main or periphery areas. In aspects, a light on the device is activated to facilitate the higher resolution camera to capture more accurate images. In an example, a lower-resolution camera determines a subject is in the periphery of the scene. Thereafter, a higher-resolution camera is activated. In aspects, a light is also turned on to facilitate image capturing by the higher-resolution camera. The combination of two types of camera sensors enables more accurate facial recognition analysis to be performed and more accurate motion events to be evaluated.

In an aspect, the camera sensors may operate in two modes, a low-power, low-resolution mode and high-power, high-resolution mode. Operation of a camera sensor in a low-resolution mode uses less power and results in a higher frame rate of image capture. Operating in a high-resolution mode will most result in a lower frame rate of image capture. The cameras may operate in a low-resolution mode until motion is detected within a degree of confidence. Thereafter, the camera sensors may operate in a high-power mode for facial recognition or to have greater accuracy in identifying the human body characteristics and motion.

In aspects, the environment may be dim making it challenging for certain sensors to detect a distance between the subject to the device or a location of the subject relative to the device. To address scenarios when a room does not have enough illumination to detect a distance between a subject and a device or a location of the subject relative to the device, different types of sensors are used by the device. In an example, an IR sensor is used to detect motion. Once motion is detected, a light bar on the device, such as a soundbar, is activated. Thereafter, a camera sensor is activated to perform image capturing and/or video for analysis. In aspects, the light bar is composed of an array of light emitting diodes (LEDs) that are used to show active use of a device, such as a response to voice commands, but may also serve the function of illuminating the general environment in extremely dark environments up to a minimal level by which the camera sensor may capture better images. The illumination may be visible or in the infrared spectrum. The light bar is not used to illuminate the vicinity when the light level is high enough already, such as during daytime.

The activation of the light bar functions to increase the illumination level of the environment to a high enough level for the camera sensor to be able to capture images and video that can be used to accurately identify the physical characteristics of the moving subject using the camera sensor, but which may not completely light up the room and general vicinity of the house at a level that would cause sleeping individuals or people in other parts of the house to take notice that a previously darkened room became brightly light all by itself. The illuminance of the light bar may be increased gradually or in steps as the images processed from the camera sensor show an increasing probability that the moving object is a human being and that the physical motion of the human being indicates a desire to interact with the product.

Figure 7:
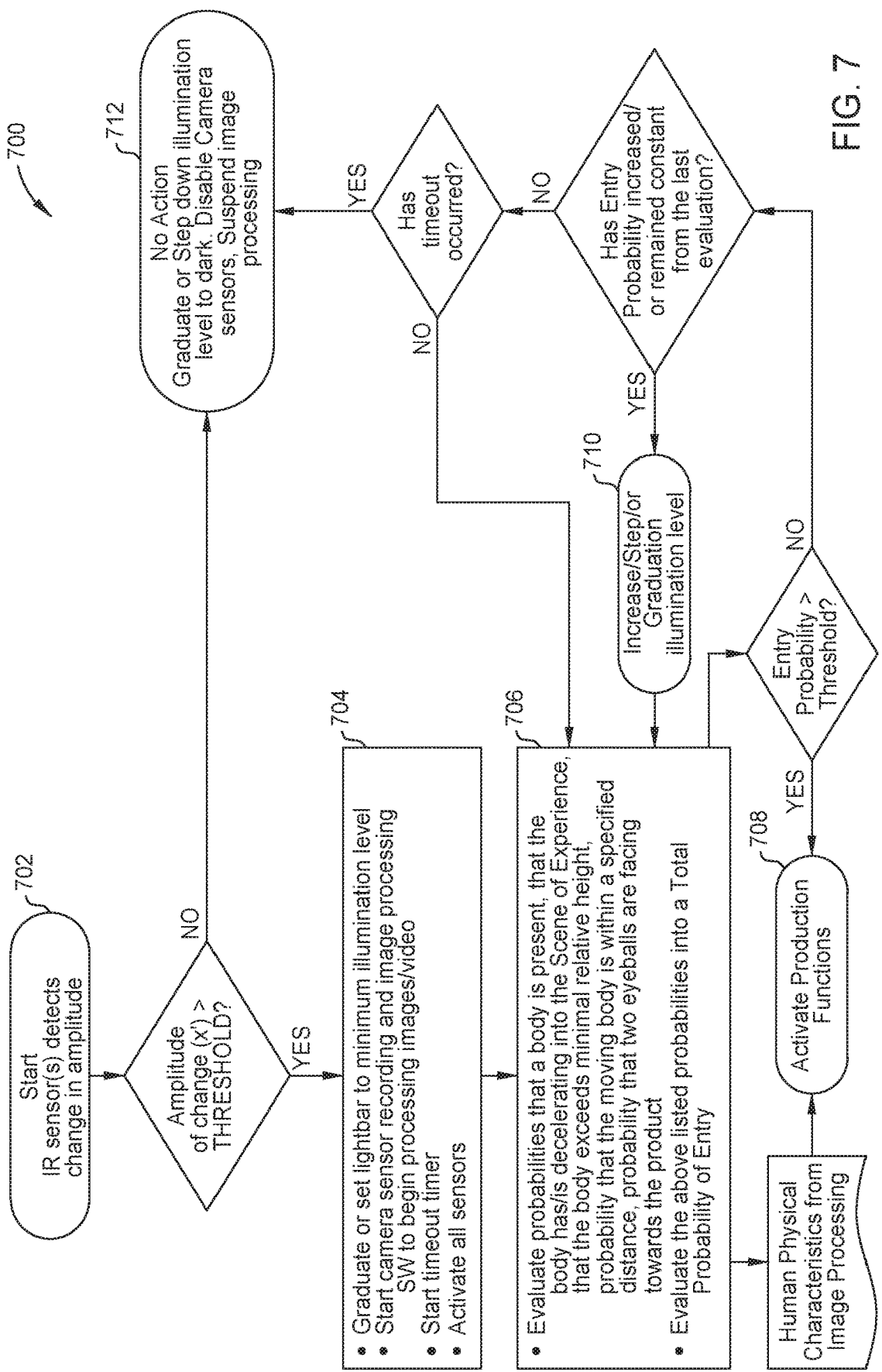
FIG. 7 illustrates an example illumination method.

FIG. 7 illustrates an example light bar illumination method 700 used to illuminate a portion of the environment in response to an increasing probability that the motion and physical characteristics indicate the presence of a subject moving towards the zone of experience. At 702, an IR sensor detects a change in amplitude in the environment. At 704, when the change in amplitude exceeds a threshold value, the light bar is set to a minimum illumination level for visible light and maximum for infrared light. Further, a camera sensor begins recording, image processing software beings processing captured images and recorded video. In aspects, a timeout timer begins and other sensors at the device are activated. At 706, for the period defined by the timeout timer, probabilities are evaluated. Example probabilities include the probability that a human body is present, the human is decelerating in the scene of experience, that detected human exceeds a minimum relative height, the moving subject is within a specified distance, the two eyeballs of the subject are directed towards the device. Any combination of estimated probabilities are combined to determine a Total Probability of Entry. If the Total Probability of Entry is greater than a threshold value, at 708, features at a device are activated. The features include triggering output that indicates device readiness, activating devices, or outputting preconfigured or subject-specific prompts based on the detected subject. In aspects, subject-specific prompts or selections are based on human physical characteristics from image processing.

If the Total Probability of Entry is less than a threshold value, the illumination level is increased, either gradually or step-wise. The Total Probability of Entry is recalculated. If the recalculated Total Probability of Entry is less than the previously-determined Total Probability of Entry (from step 706), and the timeout timer is still running, the operations return to step 706, where probabilities that a subject is present are reevaluated. If the timeout timer has expired, at 712, a subject is determined not to be in the environment. The illumination level of the light bar is reduced, and camera sensors are disabled.

As the illumination of the environment increases, so does the accuracy of the analysis of image processing software in analyzing images and/or video from the camera sensor.

Therefore, the light bar may come on for a short duration of time for the camera sensor and image processing software to be able to identify if the object entering the room was an actual human being, an animal, a child versus a false detection of motion. As shown in FIG. 7, if the image processing software successfully determines that a person is in the room, the product may maintain the illumination of the light bar and may activate the functionality of the product.

Figure 8:
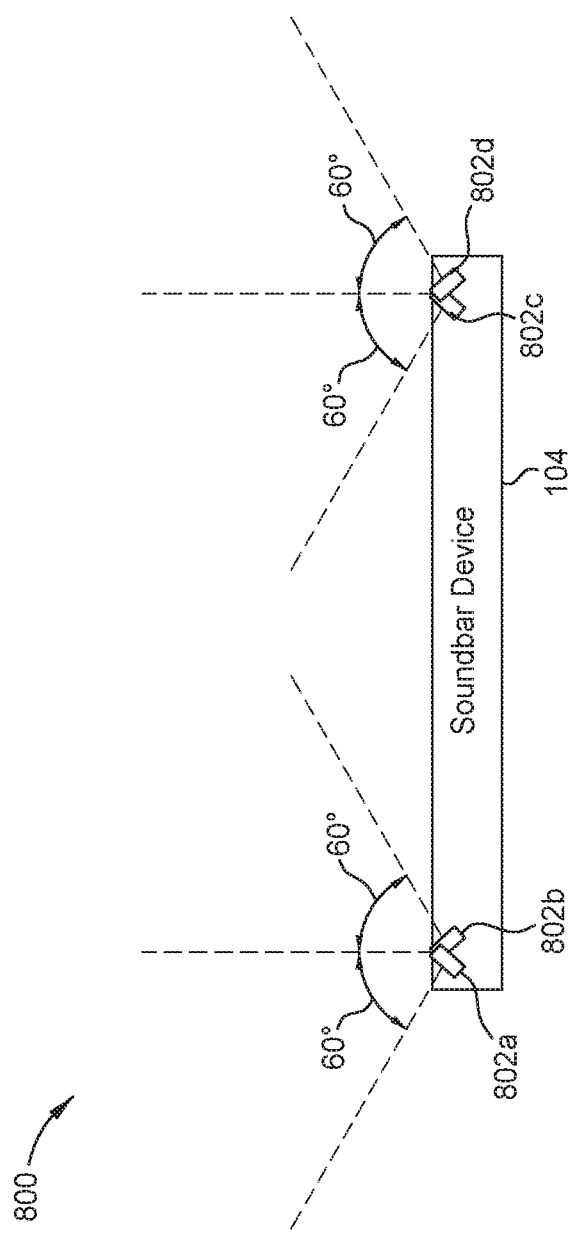
FIG. 8 illustrates an example sensor positioning on a device.

FIG. 8 illustrates example sensor positioning 800 on a device. In aspects, four camera sensors are positioned on the device such as a soundbar 104. Each sensor may be a low-resolution camera sensor, equipped with a lens and a field of view of 60° or greater. In FIG. 8, sensors 802a, 80b, 802c, and 802d have a field of view of 60°. The sensors 802a-80d may correspond to 108a-108b in FIGS. 1-3.

Figure 9:
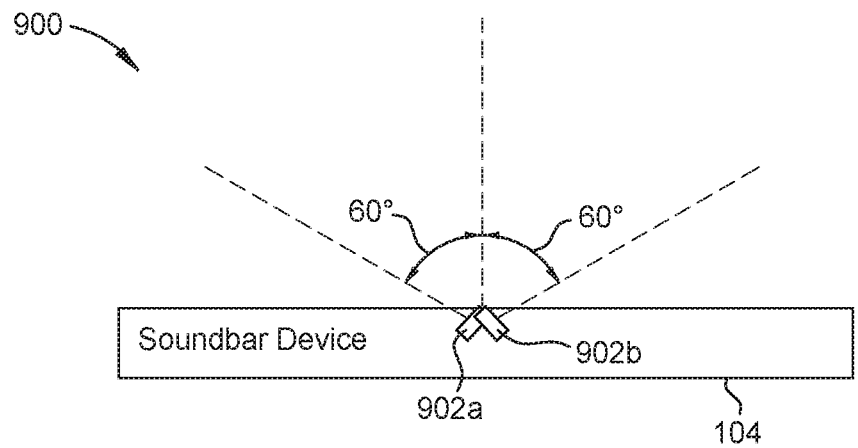
FIG. 9 illustrates an example sensor positioning on a device.

FIG. 9 illustrates example sensor positioning 900 on a device. In aspects, two camera sensors are positioned on the device such as a soundbar 104. Each sensor may be a low-resolution camera sensor, equipped with a lens and a non-overlapping field of view of 60° or greater. In FIG. 9, sensors 902a and 902b each have a non-overlapping field of view of 60°. A subset of functionalities may be employed when the device has two sensors as compared to four sensors. When a single sensor is used (not illustrated) with a wide angle lens, such as one that achieves a 120° field of view, fewer functions may be performed with high accuracy. In an example, detecting entry and exit may be performed with high accuracy and identifying a subject may be performed with less accuracy.

Figure 10:
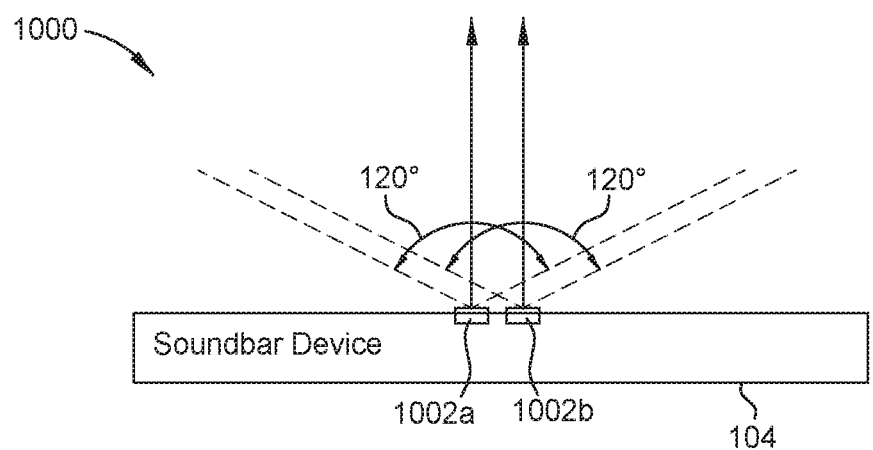
FIG. 10 illustrates an example sensor positioning on a device.

FIG. 10 illustrates example sensor positioning 1000 on a device. In aspects, two camera sensors are positioned on the device such as a soundbar 104. Each sensor may be a low-resolution camera sensor, equipped with a wide angle lens. In FIG. 10, sensors 1002a and 1002b have a limited overlapping field of view of 120°. Using two sensors and a wide angle lens may distort height and width of subjects; however, the positioning 1000, similar to positioning 800 and 900, collects signals to determine physical characteristics of a moving body, evaluate an identity of a subject, and identify entry and exit events.

If the sensors have a greater field of view than 60° (or less), each sensor may be positioned more obliquely or acutely than indicated. The formulation for the positioning of the sensors is that in each group of sensors (at the left, at the right) the center-line of the sensor edge's field of view does not overlap to the other sensor's edge field of view or only minimally overlaps. This orientation maximizes the coverage at the edges of the room and minimizes the lack of coverage directly in front of the device 104.

In FIG. 8, each group of two sensors is positioned at the corners of the device 104 or greater than a minimum distance threshold that is required by image processing software to accurately evaluate distances of a human shape object, based upon the boundary conditions, as determined by an algorithm. Regardless of sensor configuration, images are received from each camera sensor and processed by image processing software. The image processing identifies moving shapes from each sensor using an algorithm which evaluates color and shade changes in the image pixels as compared with the previously static background image of a relatively non-moving background, analyzing and determining that a shape has moved by evaluating the boundary of the color, shade changes, gross number of pixel changes, and location for pixel changes from the background moving across the field of view.

The boundaries of the moving shape are evaluated by the algorithm to determine the location of the calculated horizontal center, width, and height of the moving shape boundaries from each sensor. The calculated boundaries are relative to each specific sensor. Multiple image captures and image analysis is processed at a high capture rate, which allows these physical characteristics of the moving shape to be determined as each shape moves across the scene: distance relative to the device, angle relative to the device, relative width and changes in relative width, relative height and changes in relative height, and positions and motion of the moving shape.

In aspects, analyzing the above information allows determination of the following: if the moving shape is the primary adult user who set up the product, if the moving shape is a child, if the moving shape is a female adult user of the device, if the moving shape is not a human, a count of the number of distinct adult humans in the scene, a count of the number of distinct child humans in the scene, if the moving shape is a user who has entered account or network credential information into the application used to either set up and/or control the device, and if the moving shape is not a person who has used or set up the device using the application.

In one example, a moving shape enters the scene of experience, having an average height of 5' 8" and a maximum width of 16 inches at the mid-line (50%) of the shape's height. These values indicate that the moving shape is a human adult. The characteristics match to the primary user's physical characteristics which were evaluated during the setup and subsequent uses of the product. Two additional shapes are evaluated to be present, one that is 3' 6" and another that is 4' 0". The two additional shapes approximately match the ratio of height to width for a human, but their size is below a threshold indicating that these two shapes are children.

In aspects, the sensors collect information to determine the velocity at which a subject is moving and if the subject is accelerating or decelerating. If a subject is determined to decelerate in the vicinity of the device, their purpose may be to interact with the device. The vicinity may refer to any portion of the environment 100, including the periphery of the scene or the main area of the scene. In response to a decelerating subject, the device may display subject-specific prompts or outputs. In response to an accelerating subject or a subject moving with constant or substantially constant velocity, the device may refrain from activating or outputting subject-specific prompts. In certain aspects, when a subject is determined to be accelerating out of the environment 100, the devices may pause, begin a timer, and enter a power-saving state after expiry of the timer if no subjects are determined to be present in the environment.

In aspects, in addition to activating or configuring the device itself and attached devices, the device also sends a control message to other products in the household. The products may be devices outside of the environment 100 and/or non-audio or video devices. The control messages inform other products a person is present, entering, or exiting the scene of where device is located which will cause the other products to perform functions.

In an example, upon detecting a subject's presence in a living room, the device sends a control message via a Wi-Fi connection through a Wi-Fi access point to the Wi-Fi speakers in other rooms (which are outside of the scene of experience) to cease playback of an audio Internet stream from an online service. The device then begins playback of that same audio Internet stream in the room where the user is currently located.

In an example, upon detecting the subject's presence, the device sends a control message to devices in other rooms (which may be outside the scene of experience) for incoming Bluetooth phone calls to be directed to the room at which the subject is located. While the subject's smart phone may be still paired to the wireless speaker in another room, the subject will now be able to receive incoming calls in the room at which they are currently located.

In an example, upon detecting the subject's presence, the device controls non-audio/video devices which are either in the periphery or outside the periphery of the scene. In aspects, the device sends a message to Internet-of-things (IoT) network-controlled thermostat via Wi-Fi or BLE connection to increase or decrease the temperature in the room that the user is located, or to increase or decrease the temperature in the room that the subject has left. In an example, upon detecting the subject's presence, the device sends a message to an IoT network-controlled light fixture in the scene of experience via Wi-Fi or BLE connection to increase the illumination level of room.

Currently, a subject waits for a device to activate and then interacts with the device. By detecting the presence of the subject and activating the device as the user enters the general vicinity of the device without waiting for the subject to touch the product or associated remote control, the subject experiences less of a delay in activation, start-up, and usage. Accordingly, the entry presence detection mechanism described herein reduces the amount of time a user waits for a device to start-up, exit from low-power standby, and/or perform a function of the product or software function of the device.

Further, the entry detection mechanism described herein activates a device without requiring a remote control. In aspects, a remote control is also not needed to interact with the device. For example, voice recognition software in a device in the environment may be triggered in response to detected presence in one or more of the scene of experience or the zone of experience. Additionally, voice recognition software may perform more intensive computations and analysis of recorded sounds, which provides a greater accuracy of voice recognition.

The entry detection mechanism allows a device to perform preset or preconfigured functions in response to a subject's presence, proximity, location, number of users, or physical characteristics. Instead of activating to a general selection menu, devices described herein activate specific functions. Further, a user or software may also configure the preset function to be performed based upon the time of day or other criteria.

Typically, a first device needs to be activated before connected devices are usable; however, the entry detection mechanism activates and configures the device and attached devices in advance of specific manual activation of any device. This virtually eliminates the time experienced waiting for the first device to activate. Typically, on-screen or on-device displays activate after a subject activates a function, such as selecting the on-screen or on-device display content and waiting for it to be displayed. The entry detection mechanism allows an on-screen display or on-device display to activate and display video, text, or other multimedia content in response to the subject's presence.

In the preceding, reference is made to aspects presented in this disclosure. However, the scope of the present disclosure is not limited to specific described aspects. Aspects of the present disclosure may take the form of an entirely hardware embodiment, an entirely software embodiment (including firmware, resident software, micro-code, etc.) or an embodiment combining software and hardware aspects that may all generally be referred to herein as a "component," "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

The flowchart and block diagrams in the Figures illustrate the architecture, functionality and operation of possible implementations of systems, methods and computer program products according to various aspects. In this regard, each block in the flowchart or block diagrams may represent a module, segment or portion of code, which comprises one or more executable instructions for implementing the specified logical function(s). In some implementations, the functions noted in the block may occur out of the order noted in the Figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

The invention claimed is:

1. A device comprising:
one or more sensors configured to collect information relating to a location of a subject relative to the device;
a memory coupled to a processor; and
instructions, stored in the memory that when executed, cause the processor to:
determine the location of the subject relative to the device based on the information;
determine, based on the information, the subject is one of decelerating towards the device or accelerating away from the device; and
trigger a set of one or more features based on the location of the subject relative to the device and whether the subject is decelerating towards the device or accelerating away from the device, wherein triggering the set of one or more features comprises:
triggering a subject-specific output when the subject is decelerating towards the device; and one of pausing an output of the device or initiating a timer at the device when the subject is accelerating away from the device.

2. The device of claim 1, wherein the instructions for causing the processor to determine the location of the subject relative to the device comprise:
determining, based on the information, whether the subject is within a first area of locations relative to device or a second area of locations relative the device, wherein the first area of locations is farther towards an edge of detection of the device as compared to the second area of locations.

3. The device of claim 2, wherein the instructions for causing the processor to trigger the set of one or more features further comprise:
triggering a first set of features when the subject is within the first area of locations, and
triggering a second set of features when the subject is within the second area of locations.

4. The device of claim 3, wherein the second set of features comprises configurable subject-specific features.

5. The device of claim 2,
wherein the one or more sensors comprise at least one lower-resolution camera and at least one higher-resolution camera, and
wherein determining whether the subject is within the first area of locations or within the second area of locations comprises:
determining, based on information received from the at least one lower-resolution camera, that the subject is in the first area of locations; and
powering on the at least one higher-resolution camera in response to determining the subject is in the first area of locations to collect the information.

6. The device of claim 5, further comprising:
a light; and
instructions that cause the processor to activate the light in response to determining, based on the information received from the at least one lower-resolution camera, that the subject is in the first area of locations prior to powering on the at least one higher-resolution camera.

7. The device of claim 1, wherein:
the one or more sensors are further configured to collect information associated with one or more physical characteristics of the subject, and
further comprising instructions that cause the processor to:
compare the collected information associated with the one or more physical characteristics to a set of configured physical characteristics to determine an identity of the subject, wherein the set of one or more features that are triggered are based, at least in part, on the determined identity.

8. The device of claim 1, wherein the set of one or more features comprises:
one of exiting a low-power state by the device or outputting flashing lights by the device.

9. The device of claim 1, wherein the instructions that cause the processor to trigger the set of one or more features based on the determined location of the subject relative to the device comprise:
triggering one or more features at another device in communication with the device.

10. The device of claim 1, wherein the instructions that cause the processor to trigger the set of one or more features is further based on at least one of velocity of the subject or vector of motion of the subject.

11. The device of claim 1, wherein the set of one or more features comprises triggering a voice recognition software in the device based on the determined location.

12. A method for triggering a set of features by a device comprising:
collecting, via one or more sensors, information relating to a location of a subject relative to the device;
determining the location of the subject relative to the device based on the information;
determining, based on the information, the subject is one of decelerating towards the device or accelerating away from the device; and
triggering the set of features based on the determined location of the subject relative to the device and whether the subject is decelerating towards the device or accelerating away from the device, wherein triggering the set of one or more features comprises:
triggering a subject-specific output when the subject is decelerating towards the device; and
one of pausing an output of the device or initiating a timer at the device when the subject is accelerating away from the device.

13. The method of claim 12, further comprising:
determining, based on the information, whether the subject is within a first area of locations relative to the device or a second area of locations relative to the device, wherein the first area of locations is farther towards an edge of detection of the device as compared to the second area of locations,
wherein triggering the set of features further comprises triggering a first set of features when the subject is within the first area of locations, and triggering a second set of features when the subject is within the second area of locations.

14. The method of claim 13, wherein the second set of features comprises configurable subject-specific features.

15. The method of claim 12, further comprising:
receiving input associated with physical characteristics for individual subjects in a set of subjects;
receiving input associated with preferred features to be triggered for each of the individual subjects in the set of subjects;
collecting, via the one or more sensors, information associated with one or more physical characteristics of the subject; and
comparing the collected information associated with the one or more physical characteristics to the received input associated with the physical characteristics for the individual subjects to identify the subject as one of the subjects in the set of subjects,
wherein the set of features that are triggered are further based, at least in part, on the identified subject and the received input associated with the preferred features to be triggered.

16. The method of claim 12, wherein triggering the set of features further comprises triggering a feature in another device external to the device.

17. A device comprising instructions stored in memory that when executed cause a processor to:
collect, using at least one camera sensor, information relating to a location of a subject relative to the device and physical characteristics of the subject;
receive input associated with physical characteristics for individual subjects in a set of subjects;
receive input associated with subject-specific features for each of the individual subjects in the set of subjects;
determine the location based on the information;

identify the subject based on the collected physical characteristics and input associated with the physical characteristics;
determine, based on the information, the subject is one of decelerating towards the device or accelerating away from the device; and
one of:
  trigger at least one of the subject-specific features associated with the identified subject based on the determined location when the subject is decelerating towards the device, or
  one of pause an output of the device or initiate a timer at the device when the subject is accelerating away from the device.

18. The device of claim 17, further comprising instructions that cause the processor to:
determine, based on the information, whether the subject is within a first area of locations relative to the device or a second area of locations relative to the device, wherein the first area of locations is farther towards an edge of detection of the device as compared to the second area of locations; and
trigger a first set of features when the subject is in the first area of locations,
wherein at least one of the subject-specific features is triggered when the subject is in the second area of locations.

19. The device of claim 18, wherein:
the first set of features comprise one of exiting a low-power state by the device or outputting flashing lights by the device.

20. The device of claim 18, wherein:
at least one of the subject-specific features comprise outputting an audio or video content by another device external to the device.

* * * * *